US011423009B2

(12) United States Patent
Stennett et al.

(10) Patent No.: US 11,423,009 B2
(45) Date of Patent: Aug. 23, 2022

(54) SYSTEM AND METHOD TO PREVENT FORMATION OF DARK DATA

(71) Applicant: ThinkData Works, Inc., Toronto (CA)

(72) Inventors: Brendan Stennett, Toronto (CA); Bryan Smith, Toronto (CA); Yousuf Chowdhary, Toronto (CA)

(73) Assignee: ThinkData Works, Inc., Toronto (CA)

( * ) Notice: Subject to any disclaimer, the term of this patent is extended or adjusted under 35 U.S.C. 154(b) by 0 days.

(21) Appl. No.: 16/880,411

(22) Filed: May 21, 2020

(65) Prior Publication Data

US 2020/0379974 A1    Dec. 3, 2020

Related U.S. Application Data

(60) Provisional application No. 62/853,907, filed on May 29, 2019.

(51) Int. Cl.
*G06F 16/23* (2019.01)
*G06F 16/22* (2019.01)

(52) U.S. Cl.
CPC ...... *G06F 16/2365* (2019.01); *G06F 16/2228* (2019.01)

(58) Field of Classification Search
CPC .................. G06F 16/2365; G06F 16/2228
See application file for complete search history.

(56) References Cited

U.S. PATENT DOCUMENTS

| | | | |
|---|---|---|---|
| 2005/0086246 A1* | 4/2005 | Wood | G06F 16/21 |
| 2008/0208946 A1* | 8/2008 | Boritz | G06F 21/552 |
| | | | 708/517 |
| 2014/0280287 A1* | 9/2014 | Ganti | G06F 16/248 |
| | | | 707/766 |
| 2015/0106341 A1* | 4/2015 | Gould | G06F 16/24544 |
| | | | 707/687 |
| 2017/0039253 A1* | 2/2017 | Bond | G06F 16/2474 |
| 2017/0147648 A1* | 5/2017 | Aronovich | G06F 16/128 |

* cited by examiner

*Primary Examiner* — Jensen Hu

(74) *Attorney, Agent, or Firm* — White and Williams LLP

(57) ABSTRACT

A method is provided for preventing dark data in a data set. At a time t1, a first version of the data set is received. The first version is analyzed and its parameters are gathered in a first statistical profile. The first statistical profile is stored. At a time t2, a second version of the data set is received. The second version is analyzed and its parameters are gathered in a second statistical profile. The second statistical profile is stored. The first and second statistical profiles are compared and a similarity index is created. If the similarity index exceeds a pre-set threshold, dissimilarity is flagged and a responsive action is taken.

19 Claims, 10 Drawing Sheets

| Company | Year | Quarter | Sales |
|---|---|---|---|
| Acme Inc. | 2017 | Q1 | $ 5,000,000.00 |
| Globex Corp. | 2017 | Q1 | $ 20,000.00 |
| Intech | 2017 | Q1 | $ 650,000.00 |

FIG. 6

| Data Set Id | Version | Timestamp | Column | Average | Min | Max | Stddev | Variance | Frequency | Null Count |
|---|---|---|---|---|---|---|---|---|---|---|
| 1 | 1 | 2017-04-01 3:35:45 | Company | 9 | 6 | 12 | 3 | 9 | 3 | 0 |
| 1 | 1 | 2017-04-01 3:35:45 | Year | 2017 | 2017 | 2017 | 0 | 0 | 1 | 0 |
| 1 | 1 | 2017-04-02 3:35:45 | Quarter | 2 | 2 | 2 | 0 | 0 | 1 | 0 |
| 1 | 1 | 2017-04-01 3:35:45 | Sales | $ 1,890,000.00 | $ 20,000.00 | $ 5,000,000.00 | $ 2,711,696.89 | $ 7,353,300,000,000.00 | 3 | 0 |

FIG. 7

| Company | Year | Quarter | Sales |
|---|---|---|---|
| Acme Inc. | 2017 | Q2 | $ 5,250,000.00 |
| Globex Corp. | 2017 | Q2 | $ 35,000.00 |
| Intech | 2017 | Q2 | $ 610,000.00 |

FIG. 8

| Data Set Id | Version | Timestamp | Column | Average | Min | Max | Stddev | Variance | Frequency | Null Count |
|---|---|---|---|---|---|---|---|---|---|---|
| 1 | 2 | 2017-07-01 5:10:35 | Company | 9 | 6 | 12 | 3 | 9 | 3 | 0 |
| 1 | 2 | 2017-07-01 5:10:35 | Year | 2017 | 2017 | 2017 | 0 | 0 | 1 | 0 |
| 1 | 2 | 2017-07-01 5:10:35 | Quarter | 2 | 2 | 2 | 0 | 0 | 1 | 0 |
| 1 | 2 | 2017-07-01 5:10:35 | Sales | $ 1,965,000.00 | $ 35,000.00 | $ 5,250,000.00 | $ 2,859,383.67 | $ 8,176,075,000,000.00 | 3 | 0 |

FIG. 9

| Company | Year | Quarter | Sales |
|---|---|---|---|
| Acme Inc. | 2017 | Q3 | $ 5,380,000.00 |
| Globex Corp. | 2017 | Q3 | $ 25,000.00 |
| Intech | 2017 | Q3 | $ 650,000.00 |

FIG. 10

| Data Set Id | Version | Timestamp | Column | Average | Min | Max | Stddev | Variance | Frequency | Null Count |
|---|---|---|---|---|---|---|---|---|---|---|
| 1 | 3 | 2017-10-01 1:10:15 | Company | 9 | 6 | 12 | 3 | 9 | 3 | 0 |
| 1 | 3 | 2017-10-01 1:10:15 | Year | 2017 | 2017 | 2017 | 0 | 0 | 1 | 0 |
| 1 | 3 | 2017-10-01 1:10:15 | Quarter | 2 | 2 | 2 | 0 | 0 | 1 | 0 |
| 1 | 3 | 2017-10-01 1:10:15 | Sales | $ 2,018,333.33 | $ 25,000.00 | $ 5,380,000.00 | $ 2,928,012.69 | $ 8,573,258,333,333.33 | 3 | 0 |

FIG. 11

| Company | Year | Quarter | Sales |
|---|---|---|---|
| Acme Inc. | 2017 | Q4 | |
| Globex Corp. | 2017 | Q4 | |
| Intech | 2017 | Q4 | |

FIG. 12

| Data Set Id | Version | Timestamp | Column | Average | Min | Max | Stddev | Variance | Frequency | Null Count |
|---|---|---|---|---|---|---|---|---|---|---|
| 1 | 4 | 2018-01-01 2:20:50 | Company | 9 | 6 | 12 | 3 | 9 | 3 | 0 |
| 1 | 4 | 2018-01-01 2:20:50 | Year | 2017 | 2017 | 2017 | 0 | 0 | 1 | 0 |
| 1 | 4 | 2018-01-01 2:20:50 | Quarter | 2 | 2 | 2 | 0 | 0 | 1 | 0 |
| 1 | 4 | 2018-01-01 2:20:50 | Sales | | $ - | $ - | | | 3 | 3 |

FIG. 13

| Company | Year | Quarter | Sales |
|---|---|---|---|
| Acme Inc. is a company specializing in trade | 2017 | Q4 | $ 5,650,000.00 |
| Globex Corp. founded in 1920.... | 2017 | Q4 | $ 35,000.00 |
| Intech is beased in Toronto .... | 2017 | Q4 | $ 680,000.00 |

FIG. 14

| Data Set Id | Version | Timestamp | Column | Average | Min | Max | Stddev | Variance | Frequency | Null Count |
|---|---|---|---|---|---|---|---|---|---|---|
| 1 | 4 | 2018-01-01 6:20:25 | Company | 34.66666667 | 30 | 44 | 8.082903769 | 65.33333333 | 3 | 0 |
| 1 | 4 | 2018-01-01 6:20:25 | Year | 2017 | 2017 | 2017 | 0 | 0 | 1 | 0 |
| 1 | 4 | 2018-01-01 6:20:25 | Quarter | 2 | 2 | 2 | 0 | 0 | 1 | 0 |
| 1 | 4 | 2018-01-01 6:20:25 | Sales | $ 2,121,666.67 | $ 35,000.00 | $ 5,650,000.00 | $ 3,072,597.98 | $ 9,440,858,333,333.33 | 3 | 0 |

FIG. 15

| Company | Year | Quarter | Sales |
|---|---|---|---|
| Acme Inc. | 2017 | Q4 | $ 5,650,000.00 |
| Globex Corp. | 2017 | Q4 | $ 35,000.00 |
| Intech | 2017 | Q4 | $ 680,000.00 |
| Acme Inc. | 2018 | Q4 | $ 4,500,000.00 |

FIG. 16

| Data Set Id | Version | Timestamp | Column | Average | Min | Max | Stddev | Variance | Frequency | Null Count |
|---|---|---|---|---|---|---|---|---|---|---|
| 1 | 4 | 2018-01-01 5:22:33 | Company | 9 | 6 | 12 | 2.449489743 | 6 | 3 | 0 |
| 1 | 4 | 2018-01-01 5:22:33 | Year | 2017.25 | 2017 | 2018 | 0.5 | 0.25 | 1 | 0 |
| 1 | 4 | 2018-01-01 5:22:33 | Quarter | 2 | 2 | 2 | 0 | 0 | 1 | 0 |
| 1 | 4 | 2018-01-01 5:22:33 | Sales | $ 2,716,250.00 | $ 35,000.00 | $ 5,650,000.00 | $ 2,776,332.64 | $ 7,708,022,916,666.67 | 4 | 0 |

FIG. 17

| Company | Year | Quarter | Sales |
|---|---|---|---|
| Acme Inc. | 201 | Q4 | $ 5,650,000.00 |
| Globex Corp. | 2017 | Q4 | $ 35,000.00 |
| Intech | 2017 | Q4 | $ 680,000.00 |

FIG. 18

| Data Set Id | Version | Timestamp | Column | Average | Min | Max | Stddev | Variance | Frequency | Null Count |
|---|---|---|---|---|---|---|---|---|---|---|
| 1 | 4 | 2018-01-01 2:25:30 | Company | 9 | 6 | 12 | 3 | 9 | 3 | 0 |
| 1 | 4 | 2018-01-01 2:25:30 | Year | 1411.666667 | 201 | 2017 | 1048.468089 | 1099285.333 | 1 | 0 |
| 1 | 4 | 2018-01-01 2:25:30 | Quarter | 2 | 2 | 2 | 0 | 0 | 1 | 0 |
| 1 | 4 | 2018-01-01 2:25:30 | Sales | $ 2,121,666.67 | $ 35,000.00 | $ 5,650,000.00 | $ 3,072,597.98 | $ 9,440,858,333,333.33 | 3 | 0 |

FIG. 19

SYSTEM AND METHOD TO PREVENT FORMATION OF DARK DATA

FIELD OF INVENTION

The invention in general relates to Big Data and in particular to prevention of the formation of dark data.

BACKGROUND OF THE INVENTION

It has become easier and cheaper to gather data due to many different improvements in technology and changes in user behaviour. As a result, large and complex datasets have evolved which are referred to as Big Data. Generally, the term Big Data refers to large datasets that are too large or complex to be dealt with using traditional data processing techniques.

Big Data challenges include capturing data, data storage, data analysis, search, sharing, transfer, visualization, querying, updating, information privacy and data protection. There are a number of different problem areas in the Big Data ecosystem that each have their own complexities. Primarily there are the problems of volume, velocity, and variety. Volume refers to the raw size of the incoming data and the challenges associated with querying and storing such a large dataset that may not be able to reside on a single storage medium or computer. Velocity refers to the speed at which data is updating and the challenges associated with processing this at least as fast as it is coming in to avoid backlog. Variety refers to the challenges associated with the number of different ways data can be represented in terms of varied file formats, varied schemas, and varied data point representations.

The amount of data has become so large that not all of it is used for driving insight thus the term "dark data" implying that no useful knowledge was gained from it. "Dark data" is also formed when data gets polluted, and thus no useful insight can be derived from it as the data itself lacks consistency or accuracy.

It would be advantageous to have a system for analyzing incoming data in order to automatically prevent the pollution of datasets in order to prevent the formation of dark data.

SUMMARY

Broadly speaking, the present invention provides a method and a system to prevent the formation of dark data. The method and system preferably use data profiling and machine learning techniques to update Big Data spread over multiple geographic locations while preventing the formation of dark data.

Big Data refers to large datasets that are too large or complex to be dealt with traditional data processing techniques as these techniques fall short of adequately handling them. Big Data challenges include capturing data, data storage, data analysis, search, sharing, transfer, visualization, querying, updating, information privacy and data protection.

The present system and method of invention may be advantageously used when ingesting Big Data spread over multiple geographic locations.

In one embodiment a first version of a data set is analyzed. More specifically, the statistical aspects of the data set are analyzed to gather its statistical characteristics. The analysis of the data set may include gathering the information to produce a suggested schema of the data set.

A first statistical profile of the data set is preferably created. The creation of a statistical profile may comprise gathering statistical parameters of the data set and organizing the gathered statistical parameters as elements of the statistical profile in a given format.

The first statistical profile of the data set is preferably stored in a computing device so that it can be accessed at a later stage e.g. disk storage on a server or cloud storage at a remote data center.

A second version of the data set is preferably then analyzed as the data may have been updated.

A second statistical profile of the data set is then created gathering its statistical parameters. The second statistical profile of the data set is then stored preferably in a computing device so that it can be accessed at a later stage e.g. disk storage on a server or cloud storage at a remote data center.

The first statistical profile is then compared with the second statistical profile of the data set for similarity. Comparison for similarity may include comparing the different statistical parameters with each other.

If the second statistical profile is dissimilar from the first statistical profile, a responsive action is performed to prevent formation of dark data.

For example, the responsive action may include delaying the update of the data set to prevent data pollution and thus formation of dark data. The responsive action may entail sending a notification using established communication methods for notifications e.g. e-mail, text message, automated phone call, instant message using an instant messaging system, and the like. The responsive action may entail blocking the updated of the data set to prevent data pollution and thus formation of dark data. The responsive action may entail performing further automated analysis of the data set to prevent data pollution and thus formation of dark data. The responsive action may entail removing outliers or other statistical anomalies.

Combinations of the above mentioned responsive actions may also be taken.

Several versions of statistical profiles of a data set may be gathered and analyzed from different versions of the data set over a period of time. A similarity index is preferably created for the data set using the different statistical profiles gathered from the different versions of the said data set over a period of time. The similarity index may preferably be created for each of the several different statistical parameters of the data set, and each may be analyzed separately.

In one embodiment the system compares a new statistical profile of a version of the data set to the similarity index, e.g. at the level of the particular statistical characteristic (or more broadly). Preferably this process may be repeated for each of the several different statistical parameters of the data set, and each may be analyzed separately.

In one embodiment the dissimilarity of the new version of data set is determined. If the new version of data set is dissimilar beyond a threshold, then the system takes a responsive action e.g. delaying the update and performing further analysis on the data set while also sending a notification to prevent formation of dark data.

The functionality and inventive aspects of the instant invention may be associated with data ingestion systems catering to big data systems. The invention allows for the elimination of the possibility of formation of dark data that renders it ineffectual for providing insights. One type of ingestion system is described and illustrated in applicants' copending U.S. patent application Ser. No. 16/733,508, filed Jan. 3, 2020, the contents of which are incorporated herein in their entirety.

In one embodiment an Enterprise Data Warehouse (EDW) may store any one of the different data types e.g. files, databases, audio, video, mixed media, encrypted data. The application cites several examples of data types, in fact the intent is to cover all such data types that may exist currently or will be developed or may evolve over time as a result of the advancements in the different fields of computing.

According to a first aspect of the invention, a method is provided for preventing dark data in a data set. At a time t1, a first version of a data set is received. The first version is analyzed and its parameters are gathered in a first statistical profile. The first statistical profile is stored. At a time t2, a second version of the data set is received. The second version is analyzed and its parameters are gathered in a second statistical profile. The second statistical profile is stored. The first and second statistical profiles are compared and a similarity index is created. If the similarity index exceeds a pre-set threshold, dissimilarity is flagged and a responsive action is taken.

Several types of responsive actions are possible (singly or in combination). The system may prevent or delay ingestion of at least one of the first or second versions of the data set. The system may perform further automated analysis of at least one of the first or second versions. The system may send a notification to an owner or administrator of the first or second versions of the data set. The system may allow the owner or administrator to correct the version of the data set or substitute a version of the data set with a corrected version. In some cases, the correction may be performed automatically upon a prompt.

The first version of the data set is preferably a reference version.

If the similarity index is below the pre-set threshold, ingestion of the second version of the data set is preferably automatically allowed to proceed. In this case, the second version of the data set may be allowed to be merged with at least one other previously ingested version. The second version of the data set may also be itself saved as a reference version for future comparison.

The statistical profile may include, for each parameter of the data set, at least one of: average, minimum, maximum, standard deviation, variance, number of unique, null percentage, coefficient of variation, frequency.

Preferably, the statistical profile is stored in association with at least one of: dataset ID, revision, update timestamp.

In some instances, the statistical profile is stored in a relational database. For example, the profile may be stored as a JSON object. Other data formats and storage protocols may be used.

Preferably, the similarity index includes comparison of each parameter with an upper or lower limit. The comparison may then be assessed against a tolerance level. Dissimilarity may be flagged if the parameter's distance from the upper or lower limit is outside the tolerance level.

In one instance, if the parameter is a text string, dissimilarity is flagged if the string length is above or below a character limit.

The method may be repeated. For example, the method may be repeated as versions of the data set are received, or as previously received versions are ingested, or at scheduled intervals regardless of whether the previously received versions were ingested.

BRIEF DESCRIPTION OF THE FIGURES

FIGS. 6, 8, 10, 12, 14, 16, 18 are exemplary data sets presented for ingestion.

FIGS. 7, 9, 11, 13, 15, 17, 19 are exemplary statistical profiles associated respectively with the datasets in FIGS. 6, 8, 10, 12, 14, 16, 18.

DETAILED DESCRIPTION

Figure 1:
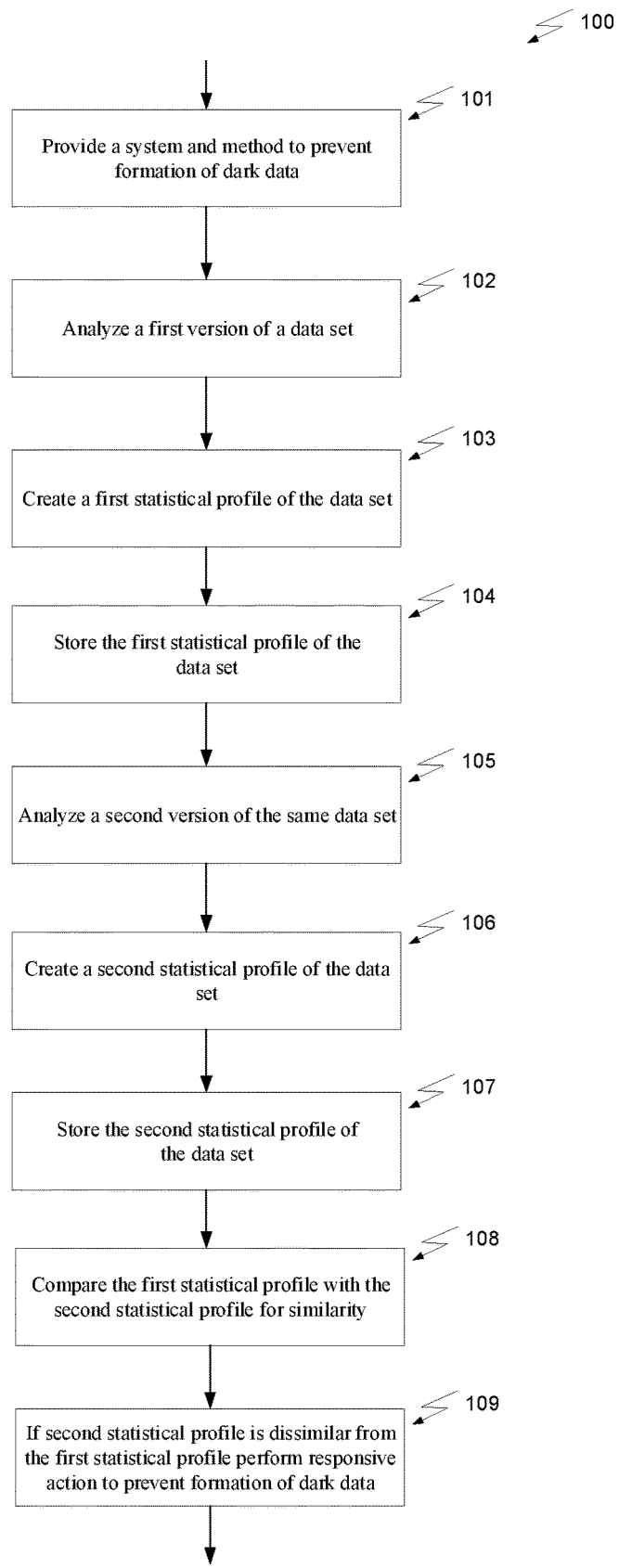
FIG. 1 is a flow diagram of a basic process for analyzing datasets to prevent formation of dark data.

Before embodiments of the invention are explained in detail, it is to be understood that the invention is not limited in its application to the details of the examples set forth in the following descriptions or illustrated drawings. It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein.

Furthermore, this description is not to be considered as limiting the scope of the embodiments described herein in any way, but rather as merely describing the implementation of the various embodiments described herein. The invention is capable of other embodiments and of being practiced or carried out for a variety of applications and in various ways. Also, it is to be understood that the phraseology and terminology used herein is for the purpose of description and should not be regarded as limiting.

Before embodiments of the software modules or flow charts are described in detail, it should be noted that the invention is not limited to any particular software language described or implied in the figures and that a variety of alternative software languages may be used for implementation of the invention.

It should also be understood that many components and items are illustrated and described as if they were hardware elements, as is common practice within the art. However, one of ordinary skill in the art, and based on a reading of this detailed description, would understand that, in at least one embodiment, the components comprised in the method and tool are actually implemented in software.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Computer program code for carrying out operations of the present invention may be written in any combination of one or more programming languages, including in object-oriented programming language such as Java, Smalltalk, C++ or the like and conventional procedural programming languages, such as the "C" programming language or similar programming languages. Computer code may also be written in dynamic programming languages that describe a class of high-level programming languages that execute at runtime many common behaviours that other programming languages might perform during compilation. JavaScript, PHP, Perl, Python and Ruby are examples of dynamic languages.

The embodiments of the systems and methods described herein may be implemented in hardware or software, or a combination of both. However, preferably, these embodiments are implemented in computer programs executing on programmable computers each comprising at least one processor, a data storage system (including volatile and non-volatile memory and/or storage elements), and at least one communication interface. A computing device may include a memory for storing a control program and data, and a processor (CPU or GPU) for executing the control program and for managing the data, which includes user data resident in the memory and includes buffered content. The computing device may be coupled to a video display such as a television, monitor, or other type of visual display while other devices may have it incorporated in them (iPad, iPhone etc.). An application or an app or other simulation may be stored on a storage media such as a DVD, a CD, flash memory, USB memory or other type of memory media or it may be downloaded from the internet. The storage media can be coupled with the computing device where it is read and program instructions stored on the storage media are executed and a user interface is presented to a user. For example, and without limitation, the programmable computers may be a server, network appliance, set-top box, SmartTV, embedded device, computer expansion module, personal computer, laptop, tablet computer, personal data assistant, game device, e-reader, or mobile device for example a Smartphone. Other devices include appliances having internet or wireless connectivity and onboard automotive devices such as navigational and entertainment systems.

The program code may execute entirely on a standalone computer, a server, a server farm, virtual machines, cloud computing, on the mobile device as a stand-alone software package; partly on the mobile device and partly on a remote computer or remote computing device or entirely on the remote computer or server or computing device. In the latter scenario, the remote computers may be connected to each other or the mobile devices through any type of network, including a local area network (LAN) or a wide area network (WAN), or the connection may be made to the internet through a mobile operator network (e.g. a cellular network); WiFi, Bluetooth etc.

The servers and processors may be physical or virtual e.g. implemented in a cloud architecture. The processing may be accomplished using a Central Processing Unit (CPU) or a Graphis Processing Unit (GPU).

Modern GPUs are very efficient at manipulating computer graphics and image processing. Their highly parallel structure makes them more efficient than general-purpose Central Processing Units (CPUs) for algorithms that process large blocks of data in parallel.

Architecturally, the CPU is composed of just few cores with lots of cache memory that can handle a few software threads at a time. In contrast, a GPU is composed of hundreds of cores that can handle thousands of threads simultaneously. The ability of a GPU with 100 plus cores to process thousands of threads can accelerate computation requiring parallel processing. Additionally, a GPU may achieve this acceleration while being more power- and cost-efficient than a CPU.

Big Data refers to large datasets that are too large or complex to be dealt with traditional data processing techniques as these techniques fall short of adequately handling them. Big Data challenges include capturing data, data storage, data analysis, search, sharing, transfer, visualization, querying, updating, information privacy and data protection.

FIG. 1 shows one embodiment. A system and method is provided to prevent the formation of dark data 101. Preferably the system and method of invention may be advantageously used when ingesting Big Data spread over multiple geographic locations.

Data ingestion is a process by which data is moved from one or more sources to a destination where it can be stored and further analyzed. The data might be in different formats and come from various sources, including RDBMS, other types of databases, S3 buckets, CSVs, or from streams. Since the data comes from different places, it needs to be cleansed and transformed in a way that allows it to be analyzed together with data from other sources. Otherwise, the data is like a bunch of puzzle pieces that don't fit together and forms dark data.

Data can be ingested in real time, in batches, or in a combination of the two. When data is ingested in batches, data is imported at regularly scheduled intervals. This can be useful when there are processes that run on a schedule, such as reports that run daily at a specific time. Real-time ingestion is useful when the information gleaned is very time-sensitive, such as data from a power grid that must be monitored moment-to-moment. Data can also be ingested using a lambda architecture. This approach attempts to balance the benefits of batch and real-time modes by using batch processing to provide comprehensive views of batch data, while also using real-time processing to provide views of time-sensitive data.

A first version of a data set is analyzed 102 to determine the statistical aspects of the data set to gather its statistical characteristics. In one embodiment the analysis of the data set may gather the information to produce a suggested schema of the data set.

A first statistical profile of the data set is created 103. The creation of a statistical profile may comprise gathering statistical parameters of the data set and organizing the gathered statistical parameters as elements of the statistical profile in a given format.

The first statistical profile of the data set is stored 104, preferably in a computing device so that it can be accessed at a later stage e.g. disk storage on a server or cloud storage at a remote data center.

A second version of a data set is analyzed 105, as the data may have been updated.

A second statistical profile of the data set is created 106 gathering its statistical parameters.

The second statistical profile of the data set is stored 107, preferably in a computing device so that it can be accessed at a later stage e.g. disk storage on a server or cloud storage at a remote data center.

The first statistical profile is compared with the second statistical profile for similarity 108, e.g. by comparing the different statistical parameters with each other.

If the second statistical profile is dissimilar from the first statistical profile, a responsive action is performed to prevent formation of dark data 109. For example, the responsive action may entail delaying the update of the data set to prevent data pollution and thus formation of dark data.

This process preferably continues for all other updates, and each time there is a new version of the data set, a new statistical profile is created, and the newly created statistical profile is then analyzed and compared with the previously gathered/saved statistical profiles.

Various types of responsive actions are possible. The responsive action may entail sending a notification using established communication methods for notifications e.g. e-mail, text message, automated phone call, instant message using an instant messaging system, and the like.

The responsive action may entail blocking the updated of the data set to prevent data pollution and thus formation of dark data.

The responsive action may entail performing further automated analysis of the data set to prevent data pollution and thus formation of dark data.

The responsive action may entail any combination of the above mentioned e.g. block the update and also send a notification while performing a further automated analysis of the data set.

Preferably, the data set is the external data residing in an external system which is to be ingested. Alternatively, the data set may be internal to an organization and is verified by the system before being merged with other data sets that may reside in the organization's internal systems.

The system and method of invention may preferably contain many different sub-systems, modules, and or components. The number and combination of the different sub-systems, modules, and or components comprising the system and method of invention may vary from one implementation to the other.

Figure 2:
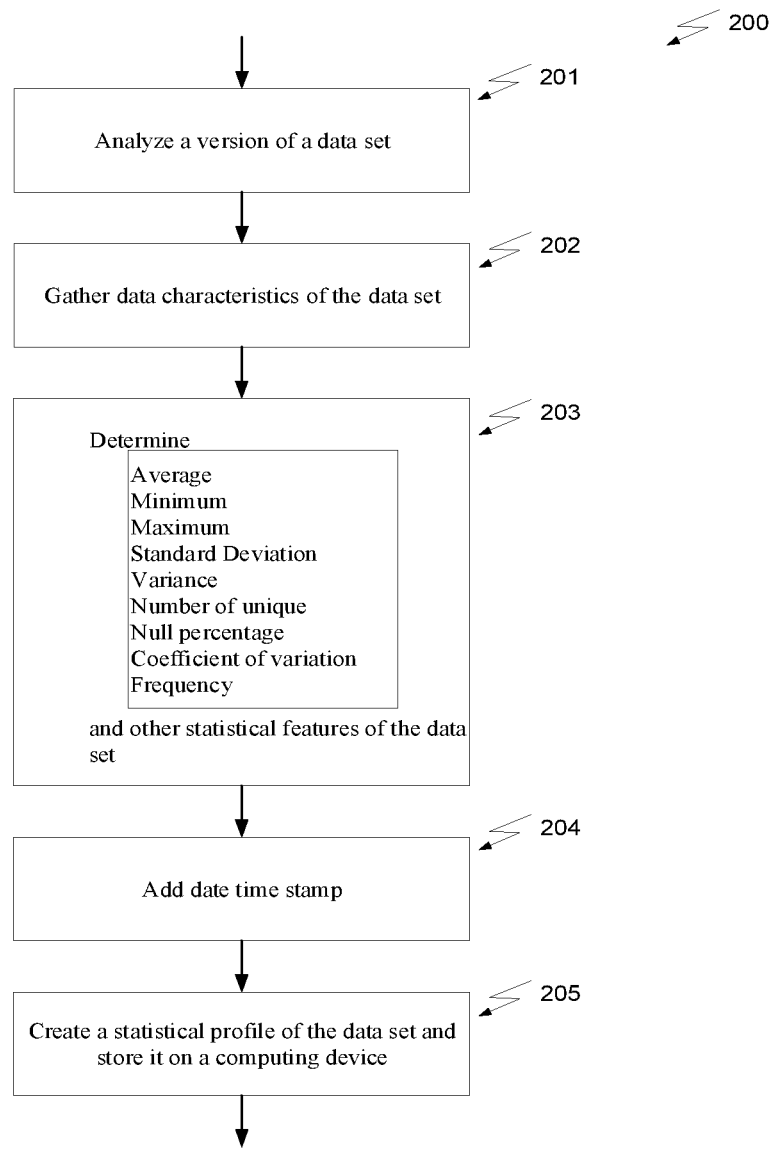
FIG. 2 is a flow diagram illustrating an exemplary process for creation of statistical profiles.

FIG. 2 shows one embodiment 200. A version of a data set is analyzed 201, e.g. at a given point in time before it is stored or merged with other data sets already resident in the data storage.

Data characteristics of the data set are gathered 202, e.g. its statistical characteristics.

The following exemplary statistical characteristics/features of the data set are determined 203:
  Average
  Minimum
  Maximum
  Standard Deviation
  Variance
  Number of unique
  Null percentage
  Coefficient of variation
  Frequency Other statistical features of the data set may be gathered and analyzed as may be pertinent to the data set and which are not listed above. The above list is exemplary and not limiting.

A date time stamp is added 204 to the statistical parameters gathered during the analysis. For example, the date time stamp may be in a Unix timestamp format. The data and time format string may be in a standard format string which may be appended to the gathered statistical parameters. A custom format may also be used. For example, one that is defined by a specific need for example location, geography, programming language, culture etc.

A statistical profile of the data set is created and stored on a computing device 205, e.g. by arranging the gathered statistical parameters in a given format and store it on a computing device. In certain embodiments the statistical profile of the data set may be encrypted for security and privacy reasons.

The statistical profile of the data set may be stored for example in a relational database where the first few columns are keys describing the relationship of the profile such as the dataset id, revision, update timestamp, and the remaining columns describe each statistic, one statistic per column.

Alternatively, the statistical profile of the data set may be stored in a relational database where the first few columns are keys describing the profile as above, and all the statistics are stored in one text column as a JSON object.

The statistical profile of the data set may alternatively be stored in a NoSQL database such as a document store where the first few properties are keys to describe the profile as above, and other properties describe each of the statistics.

Figure 3:
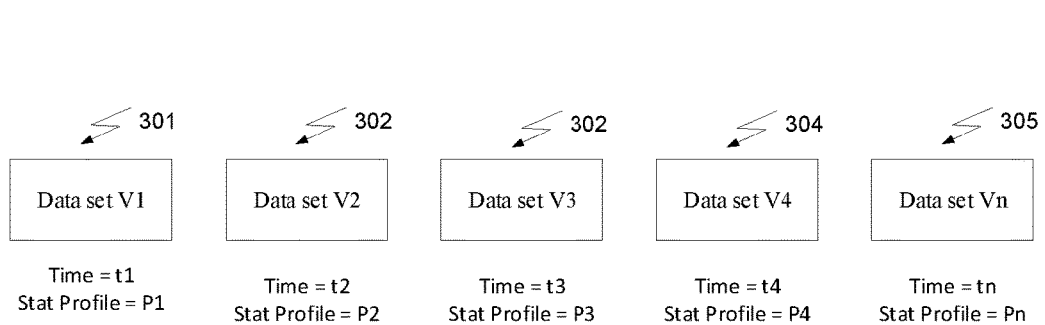
FIG. 3 is a conceptual diagram illustrating creation of statistical profiles for incoming datasets at times t1 through tn.

FIG. 3 shows one embodiment of the invention 300 where a given data set has several versions over a period of time. Each time a new version of the data set is acquired a new statistical profile is gathered for this version. Thus, when the system acquired Data set V1 at time t1, a statistical profile P1 was gathered from the statistical analysis of the data set 301.

Similarly, when the system acquired Data set V2 at time t2, a statistical profile P2 was gathered from the statistical analysis of the data set 302. While when the system acquired Data set V3 at time t3, a statistical profile P3 was gathered from the statistical analysis of the data set 303 and when the system acquired Data set V4 at time t4, a statistical profile P4 was gathered from the statistical analysis of the data set 304 and the process continued till the system acquired Data set Vn at time tn, a statistical profile Pn was gathered from the statistical analysis of the data set 305. The different versions of statistical profiles of the given data set are analyzed, namely P1, P2, P3, P4 up to Pn.

A similarity index may be created for the given data set from the statistical profiles P1, P2, P3, P4 up to Pn.

Figure 4:
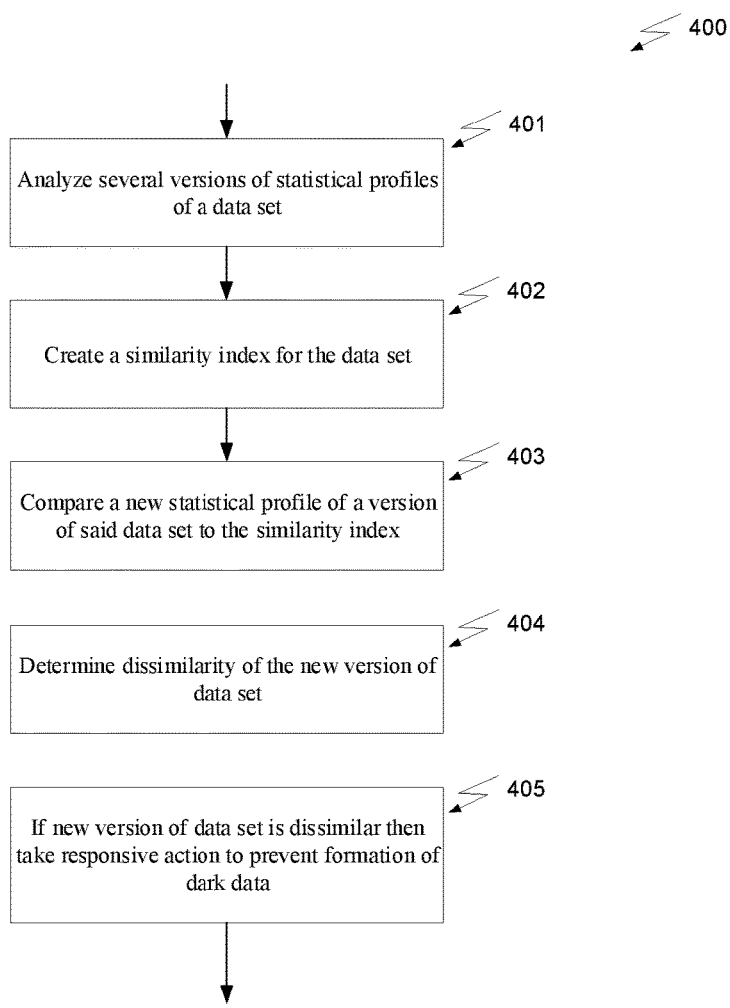
FIG. 4 is a flow diagram illustrating an exemplary process for determining and flagging dissimilarity in datasets.

FIG. 4 shows one embodiment 400. Several different versions of statistical profiles of a data set are analyzed 401. For example, these may be different statistical profiles gathered from different versions of the data set over a period of time.

A similarity index is created for the data set 402, using the different statistical profiles gathered from the different versions of the said data set over a period of time.

A similarity index may preferably be created for each of the several different statistical parameters of the data set, and each may be analyzed separately.

A new statistical profile of a version of said data set is compared to the similarity index 403.

In one embodiment a statistical characteristic of the data set is compared with the similarity index of that particular statistical characteristic. Preferably this process may be repeated for each of the several different statistical parameters of the data set, and each may be analyzed separately.

Dissimilarity of the new version of data set is determined 404.

If the new version of the data set is dissimilar, then the system may take responsive action to prevent formation of dark data 405, e.g. delay the update and perform further analysis of the data set while also sending a notification to prevent formation of dark data.

In one embodiment an Enterprise Data Warehouse (EDW) may store any one of the different data types e.g. files, databases, audio, video, mixed media, encrypted data. The application cites several examples of data types, in fact the intent is to cover all such data types that may exist currently or will be developed or may evolve over time as a result of the advancements in the different fields of computing.

Figure 5:
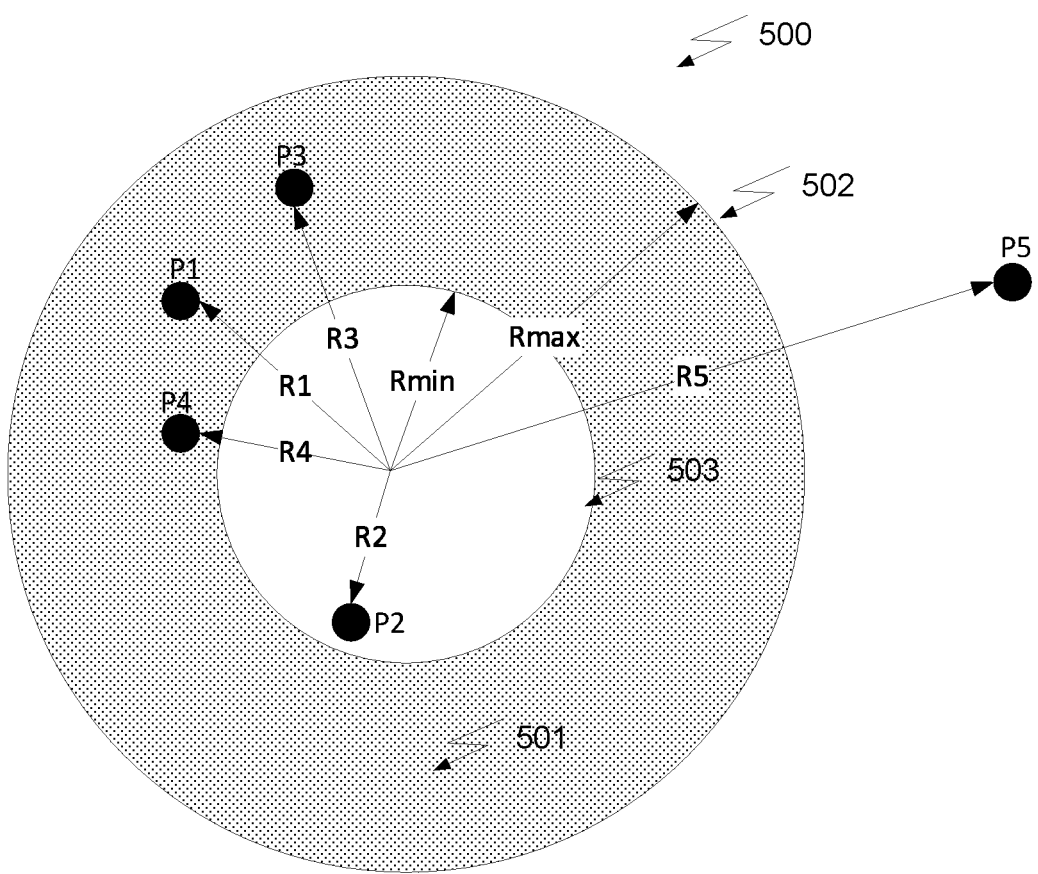
FIG. 5 is a conceptual diagram illustrating tolerance levels of dissimilarity.

FIG. 5 shows one embodiment 500 depicting different statistical profiles of a given data set gathered over a period of time as described in FIG. 3 and plotted with respect to the similarity index. Statistical profiles of a given data set are said to be similar if they are within a certain tolerance level (or tolerance band). Since no two data sets can be exactly the same it is important to ensure that they are similar within a given range of variance.

Tolerance level is used to set an upper limit and/or a lower limit of how much of a certain value can fluctuate and still be within the bounds of what may be considered normal for a given situation. Setting an upper or lower limit (or both) is optional. Where a tolerance level is used, if a data set's one or more statistical parameters are outside of the upper and/or lower limits of the tolerance level defined for a given situation, then the data set can be considered to be dissimilar and therefore could be cause of creating data pollution leading to dark data.

Tolerance level can also be considered in terms of as a measure of error that is still within reason to consider the data same or similar. Thus, if the one or more statistical parameters of a data set exhibit errors that are too large then the data set is considered to be dissimilar and therefore could be cause of creating data pollution leading to dark data. Therefore, the system of invention would advantageously identify a data set that is anomalous and will execute a responsive action deemed appropriate or as defined for the situation.

In FIG. 5 tolerance is depicted by the shaded area 501 which equals area of circle with radius Rmax 502 minus the area of the circle with radius Rmin 503. Statistical profiles that fall in the shaded area can be considered to have an acceptable tolerance while statistical profiles that fall outside of the shaded area can be considered to be too dissimilar and updating a database or other storage with data sets associated with these profiles that fall outside of the tolerance level can render it as dark data as such data sets may tend to pollute the entire database.

Thus, statistical profiles P1, P3 and P4 are within the tolerance level and it is deemed safe to update the database with these data set versions as there is no chance of data pollution and thus formation of dark data.

While statistical profiles P2 and P5 fall outside of the tolerance level and thus not updating the database with these data set versions prevents the formation of dark data.

If a statistical profile falls within the shaded area 501 it is similar and within the acceptance tolerance level and is considered to be similar to the previous versions of the data set.

If a statistical profile is outside of the shaded area 501 it is considered to be outside of the tolerance level and thus dissimilar from the pervious versions of the data set.

The process may be repeated for each of the statistical parameters of the data set individually for example first for the average, then for the minimum, then for the maximum and so on and then the results of all of the different statistical parameters are combined to calculate dissimilarity for the entire statistical profile of the data set.

The user may preferably define the tolerance level of some or several statistical parameters or features of a data set. For example, a user may define the age tolerance for a data set related to high net worth individuals to be Min=19; Max=85.

A historical analysis may be performed automatically for detection of tolerance level.

The tolerance may preferably be calculated automatically by plotting the different values of a statistical parameter gathered over a period of time in a graph and then projecting the trend lines based on previous values. A few such graphs are shown in subsequent figures. In certain embodiments each of the statistical parameters of a data set may be analyzed separately for tolerance.

Let us consider a simplistic example to illustrate the normal data updates of companies and their sales in a given year and a given quarter.

FIGS. 6, 8, 10 show a simplistic example of a good reference data set that has been updated every quarter for 3 quarters. The statistical parameters of this data set can be used as a reference and also to create a similarity index.

FIG. 6 shows a list of 3 companies and their respective sales in the first quarter of 2017. When compiling a statistical profile for a given data set the following statistical parameters may preferably be gathered amongst other statistical parameters of a data set for example:

Average
Minimum
Maximum
Standard Deviation
Variance
Number of unique
Null percentage
Coefficient of variation
Frequency For the exemplary data set in FIG. 6, some of the statistical parameters that can be gathered from the analysis are shown in FIG. 7.

FIG. 7 shows the following statistical parameters for the data set in FIG. 6 where a statistical profile may be composed of the following information:

For the column "Company" in data set represented in FIG. 6, the average length is 9, minimum length is 6, maximum length is 12, Standard Deviation is 3, Variance is 9, Frequency is 3 and Null Count is 0.

For the column "Year" in data set represented in FIG. 6, the average value is 2017, minimum value is 2017, maximum value is 2017, Standard Deviation is 0, Variance is 0, Frequency is 1 and Null Count is 0.

For the column "Quarter" in data set represented in FIG. 6, the average length is 2, minimum length is 2, maximum length is 2, Standard Deviation is 0, Variance is 0, Frequency is 1 and Null Count is 0.

For the column "Sales" in data set represented in FIG. 6, the average value is $1,89000.00, minimum value is $20,000.00, maximum value is $5,000,000.00, Standard Deviation is 2,711,696.89, Variance is 7,353,300,000,000.00, Frequency is 3 and Null Count is 0.

Thus, a statistical profile may be created from the above statistical parameters by preferably appending a date time stamp to it. In one embodiment the statistical profile may be represented as a string and may preferably be encrypted when stored on a computing system e.g., a server or a cloud storage facility or other such storage so that it can be accessed preferably over a network e.g., a LAN or the internet.

FIG. 8 shows the list of the same 3 companies and their respective sales in the second quarter of 2017.

FIG. 9 shows some of the statistical parameters that can be gathered from the analysis of the exemplary data set in FIG. 8. As described above, similarly a statistical profile may be created from the above statistical parameters by preferably appending a date time stamp to it.

FIG. 10 shows the list of the same 3 companies and their respective sales in the third quarter of 2017.

FIG. 11 shows some of the statistical parameters that can be gathered from the analysis of the exemplary data set in FIG. 10. As described above, similarly a statistical profile may be created from the above statistical parameters by preferably appending a date time stamp to it.

The above 3 data sets show an exemplary data set that has been updated over a period of time and the statistical profiles thus created from each update may represents the reference or aid in the creation of a similarity index. In one embodiment the statistical parameters from these data updates may be used to create a statistical profiles of the said data set as well as a similarity index.

FIGS. 12, 14, 16 and 18 show some simplistic examples to illustrate some aspects of data sets that may be considered anomalous.

FIG. 12 shows an example of an anomalous data set.

FIG. 13 shows the following statistical parameters for the data set in FIG. 12 where:

For the column "Company" in data set represented in FIG. 12, the average length is 9, minimum length is 6, maximum length is 12, Standard Deviation is 3, Variance is 9, Frequency is 3 and Null Count is 0.

For the column "Year" in data set represented in FIG. 12, the average value is 2017, minimum value is 2017, maximum value is 2017, Standard Deviation is 0, Variance is 0, Frequency is 1 and Null Count is 0.

For the column "Quarter" in data set represented in FIG. 12, the average length is 2, minimum length is 2, maximum length is 2, Standard Deviation is 0, Variance is 0, Frequency is 1 and Null Count is 0.

For the column "Sales" in data set represented in FIG. 12, the average value is undefined, minimum value is null, maximum value is null, Standard Deviation is undefined, Variance is undefined, Frequency is 3 and Null Count is 3.

In one embodiment a statistical profile may be created from the above statistical parameters by preferably appending a date time stamp to it.

In one embodiment the system automatically compares the above created statistical profile with the reference statistical profile created from earlier versions of the data set. The automated computer assisted comparison of the statistical profiles reveal that in the reference profile for the column "Sales" the Null Count is 0, while in the instant statistical profile for the column "Sales" the Null Count is 3.

Let's assume that the tolerance for this statistical parameter in the data set is defined as shown below. The tolerance (here, percent null) is expressed as follows:

Tolerance (Sale Column)=Null Count/Number of Rows

For Reference Data Set=0/3=0%

From FIG. 13 showing the statistical parameters for the data set in FIG. 12 we see that:

Tolerance (Sale Column)=3/3=100%

This reveals that there is an anomaly in the instant data set as the sales figures are missing.

Let's take an example of a data set that has 100,000 rows where:

Tolerance (Sales Column)=2% for an update

The tolerance here in terms of percent null implies that the data is not good for an update if more than 2% of the sales figures are missing. That is, more than 2% of the sales column figures are null (here, 100%).

Thus, inadvertently updating data from this data set can cause data pollution leading to dark data, especially for systems that may depend on this sales figure being present.

FIG. 14 shows another example of an anomalous data set.

FIG. 15 shows the following statistical parameters for the data set in FIG. 14 where:

For the column "Company" in data set represented in FIG. 14, the average length is 34.6666, minimum length is 30, maximum length is 44, Standard Deviation is 8.082903769, Variance is 65.3333333, Frequency is 3 and Null Count is 0.

For the column "Year" in data set represented in FIG. 14, the average value is 2017, minimum value is 2017, maximum value is 2017, Standard Deviation is 0, Variance is 0, Frequency is 1 and Null Count is 0.

For the column "Quarter" in data set represented in FIG. 14, the average length is 2, minimum length is 2, maximum length is 2, Standard Deviation is 0, Variance is 0, Frequency is 1 and Null Count is 0.

For the column "Sales" in data set represented in FIG. 14, the average value is $2,121,666.67, minimum value is 35,000.00, maximum value is $5,650,000.00, Standard Deviation is $3,072,597.98, Variance is $9,440,858,333, 333.33, Frequency is 3 and Null Count is 0.

In one embodiment a statistical profile may be created from the above statistical parameters by preferably appending a date time stamp to it.

In one embodiment of the invention the system and method of the invention automatically compares the above created statistical profile with the reference statistical profile created from earlier data sets. The automated computer assisted comparison of the statistical profiles reveal that in the reference profile for the column "Company" the average length is 9, minimum length is 6, maximum length is 12, Standard Deviation is 3, Variance is 9, Frequency is 3 and Null Count is 0; while in the instant statistical profile for the column "Company" the average length is 34.6666, minimum length is 30, maximum length is 44, Standard Deviation is 8.082903769, Variance is 65.3333333, Frequency is 3 and Null Count is 0. This reveals that there is an anomaly in the instant data set in the column "Company" as the values of the statistical parameters are very different from previously captured profiles.

It will be appreciated that, where strings are analyzed, there can be examples of much greater disparity. For example, the "Company" column may include some data entries that are not actually company names, but descriptions having 100s or 1000s of characters in them. The character disparity may be quite large.

FIG. 16 shows yet another example of anomalous data.

FIG. 17 shows the statistical parameters for the data set in FIG. 16 and comparing the instant statistical profile with the reference statistical profile reveals that:

In the reference statistical profile for the column "Company" the Standard Deviation is 3 and Variance is 9, while in the instant statistical profile for the column "Company" the Standard Deviation is 2.449489743 and Variance is 6. Also, in the reference statistical profile for the column "Sales" the Frequency is 3, while in the instant statistical profile for the column "Sales" the Frequency is 4. This reveals that there is an anomaly in the data set as number of unique entries does not match the row count. i.e. there are more entries in the instant data set than in the reference.

FIG. 18 shows yet another example of anomalous data.

FIG. 19 shows the statistical parameters for the data set in FIG. 18 and comparing the instant statistical profile with the reference statistical profile reveals that:

In the reference statistical profile for the column "Year" the average value is 2017, minimum value is 201, maximum value is 2017, Standard Deviation is 0, Variance is 0, Frequency is 1 and Null Count is 0, while in the instant statistical profile for the column "Year" the average value is 1411.66667, minimum value is 201, maximum value is 2017, Standard Deviation is 1048.468089, Variance is 1099285.333, Frequency is 1 and Null Count is 0.

This reveals that there is an anomaly in the data set as for the column "Year" the values of the statistical parameters are very different and there is an entry that equals 201 which is not possible as the year for the sales data and outside of our minimum tolerance of "1900" as an example. This depicts a scenario of the formation of dark data on individual data points compared to their entire profile (outliers).

This is an example of a routine type of data error in column "Year", which should have a very predictable range (or number of digits). Other examples of routine errors (not shown in the Figures) include sales or other dollar figures expressed in absolute reference (e.g. 5,650,000) versus at a scale (e.g. $5.65 M or $5.65 million). In fact, it may not be an error as such but a different way of expressing data. There may also be regional or institutional differences in expressed data that need to be reconciled.

In one embodiment of the invention the tolerance may preferably be calculated automatically by plotting the different values of a statistical parameter gathered over a period of time and then projecting the trend lines based on previous values.

Figure 20:
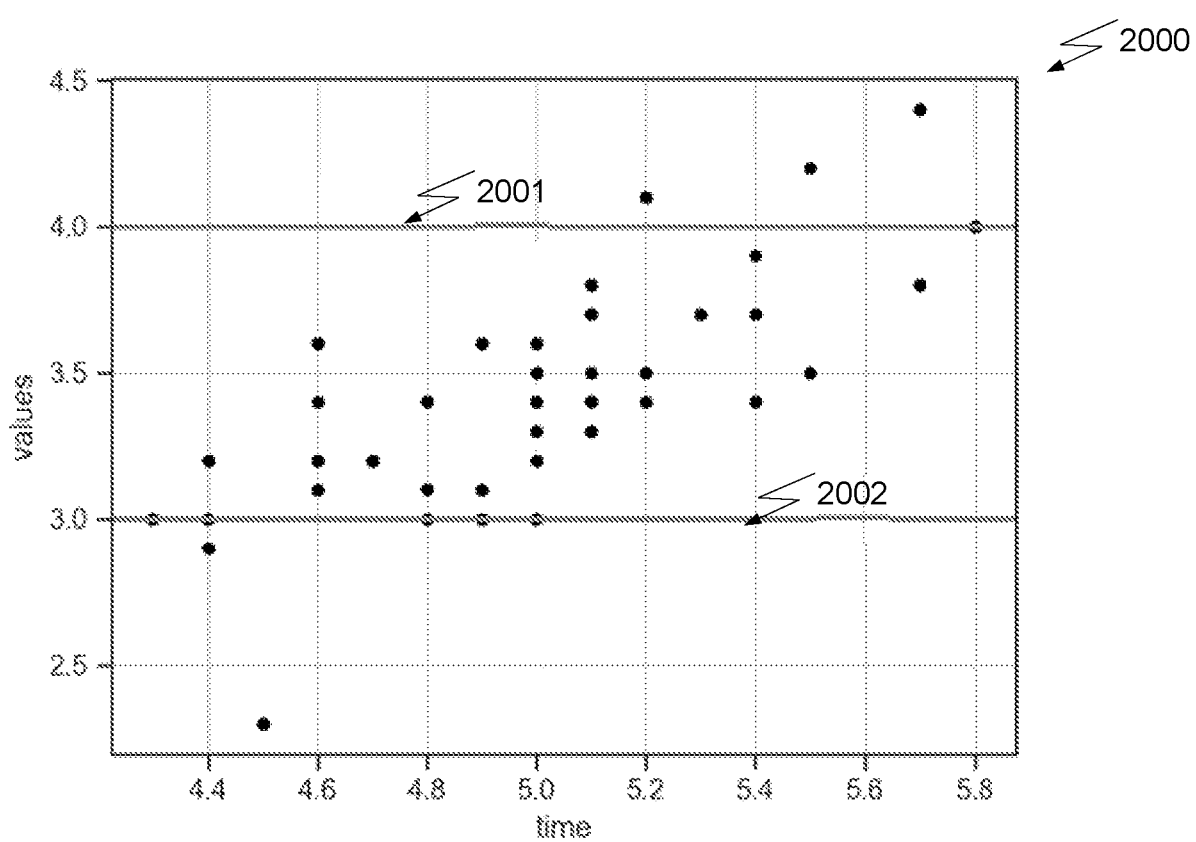
FIG. 20 is an exemplary data plot graph showing upper and lower limits (static tolerance).

FIG. 20 shows an exemplary graph of static tolerance 2000 where Tolerance Max (Tmax) 2001 and Tolerance Min (Tmin) 2002 define the upper and lower bounds of the tolerance level. The upper and lower bounds of the tolerance are static and remain constant over the period of time for which the graph has been plotted.

The various dark dots show several statistical profiles or statistical parameters plotted on the graph over time. The dark dots that are within the Tolerance Max (Tmax) 2001 and Tolerance Min (Tmin) 2002 lines may be considered within the specified tolerance level for the statistical profile of the statistical parameter plotted in the graph.

The dark dots that are above the Tmax 2001 line are outside of the upper limit of the tolerance while the dark dots that are below the Tmin 2002 line are outside of the lower limit of the tolerance for that particular statistical profile or statistical parameter.

Figure 21:
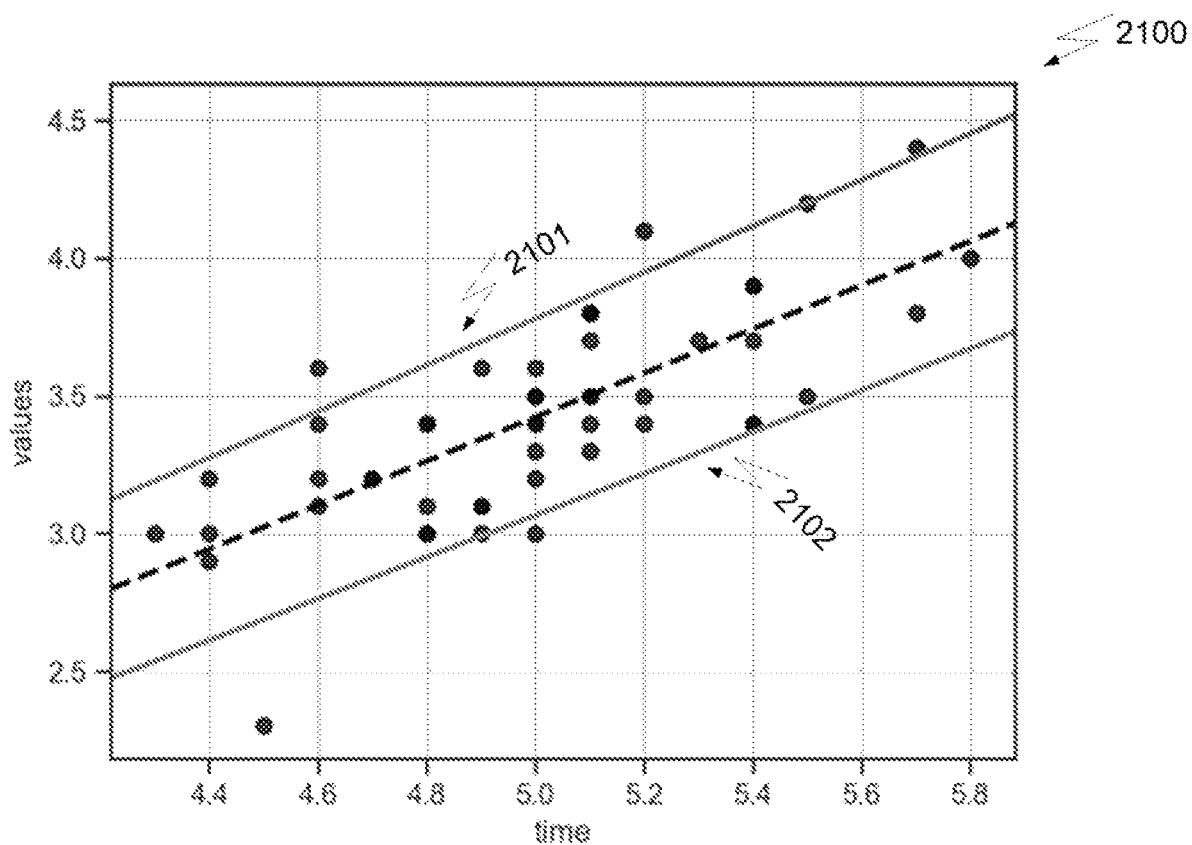
FIG. 21 is an exemplary data plot graph showing point-in-time tolerance (no correction).

FIG. 21 shows an exemplary graph of Point-in-time Tolerance no correction 2100 where Tolerance Max (Tmax) 2101 and Tolerance Min (Tmin) 2102 define the upper and lower bounds of the tolerance level. The upper and lower bounds of the tolerance are shifting with the time and change in proportion over the period of time for which the graph has been plotted.

The various dark dots show several statistical profiles or statistical parameters plotted on the graph overtime. The dark dots that are within the Tolerance Max (Tmax) 2101 and Tolerance Min (Tmin) 2102 lines may be considered within the specified tolerance level for the statistical profile of the statistical parameter plotted in the graph.

The dark dots that are above the Tmax 2101 line are outside of the upper limit of the tolerance while the dark dots that are below the Tmin 2102 line are outside of the lower limit of the tolerance for that particular statistical profile or statistical parameter.

Figure 22:
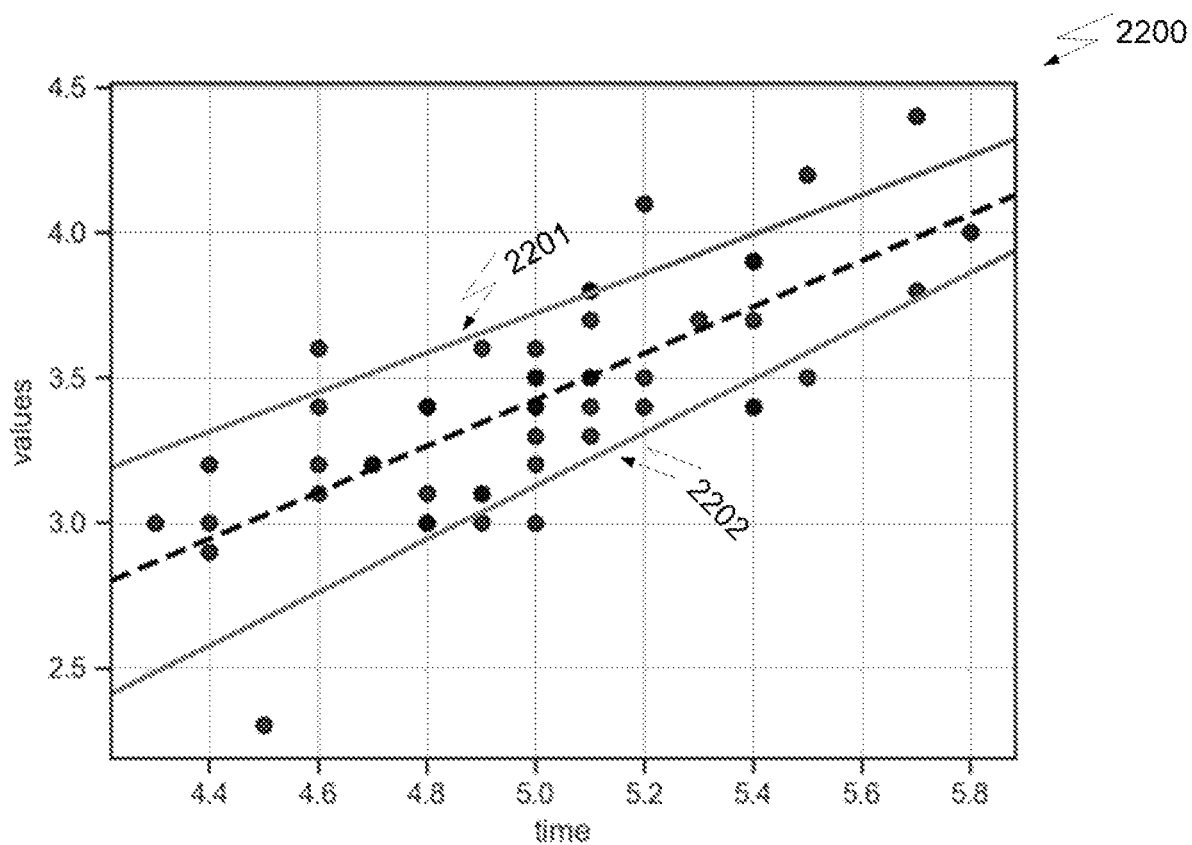
FIG. 22 is an exemplary data plot graph showing point-in-time tolerance (ever-narrower band/range of tolerance).

FIG. 22 shows an exemplary graph of Point-in-time Tolerance 2200 where having more historical information about the data sets enables the system to create an ever-narrower band/range of tolerance. Another way to look at this is that as the confidence level grows, the upper and lower bounds of the tolerance tend to converge. In the figure Tolerance Max (Tmax) 2201 and Tolerance Min (Tmin) 2202 define the upper and lower bounds of the tolerance level. The upper and lower bounds of the tolerance are converging with the passage of time over the period of time for which the graph has been plotted.

The various dark dots show several statistical profiles or statistical parameters plotted on the graph over time. The dark dots that are within the Tolerance Max (Tmax) 2201 and Tolerance Min (Tmin) 2202 lines may be considered within the specified tolerance level for the statistical profile of the statistical parameter plotted in the graph.

The dark dots that are above the Tmax 2201 line are outside of the upper limit of the tolerance while the dark dots that are below the Tmin 2202 line are outside of the lower limit of the tolerance for that particular statistical profile or statistical parameter.

In one embodiment the Point in time tolerance can be defined as tolerance based on line of best fit/trend line and generated automatically from the historic loads of the data set.

The examples noted here are for illustrative purposes only and may be extended to other implementation embodiments. While several embodiments are described, there is no intent to limit the disclosure to the embodiment(s) disclosed herein. On the contrary, the intent is to cover all practical alternatives, modifications, and equivalents.

What is claimed is:

1. A server for preventing formation of dark data in a data set, the server having a processor, a communication subsystem, and a memory, each in communication with the processor, the memory storing instructions which when executed by the processor configure the server to:

at a time t1, receive a first version of the data set to be ingested into a data warehouse;

analyze the first version and gather its parameters in a first statistical profile;

store the first statistical profile as a suggested schema, while the first version of the data set is automatically ingested into the data warehouse;

at a time t2, receive a second version of the data set to be ingested into the data warehouse;

analyze the second version and gather its parameters in a second statistical profile based on the suggested schema;

store the second statistical profile;

compare each parameter of the first and second statistical profiles with an upper or lower limit and create a similarity index;

wherein the comparison is assessed against a tolerance level and dissimilarity is flagged if the parameter's distance from the upper or lower limit is outside the tolerance level; and wherein the tolerance level is based on observed patterns from statistical profiles of historical data sets previously ingested; and if the similarity index exceeds a pre-set threshold, flag dissimilarity and take a responsive action; and automatically halt the ingestion of the second version of the data set until the dissimilarity flag is addressed through a responsive action.

2. The server of claim 1, wherein the responsive action includes performing further automated analysis of at least one of the first or second versions.

3. The server of claim 1, wherein the responsive action includes sending a notification to an owner or administrator of the first or second versions.

4. The server of claim 3, wherein the responsive action further includes allowing the owner or administrator to correct the version of the data set or substitute the version of the data set with a corrected version.

5. The server of claim 4, wherein the correction is performed automatically upon a prompt.

6. The server of claim 1, wherein the first version of the data set is a reference version.

7. The server of claim 1, wherein if the similarity index is below the pre-set threshold, ingestion of the second version is allowed to proceed.

8. The server of claim 7, wherein the second version is merged with at least one other previously ingested version of the data set.

9. The server of claim 7, wherein the second version is saved as a reference version for future comparison.

10. The server of claim 1, wherein the statistical profile includes, for each parameter of the data set, at least one of: average, minimum, maximum, standard deviation, variance, number of unique, null percentage, coefficient of variation, frequency.

11. The server of claim 1, wherein the statistical profile is stored in association with at least one of: dataset ID, revision, update timestamp.

12. The server of claim 1, wherein the statistical profile is stored in a relational database.

13. The server of claim 1, wherein the statistical profile is stored as a JSON object.

14. The server of claim 1, wherein the parameter is a text string and dissimilarity is flagged if the string length is above or below a character limit.

15. The server of claim 1, wherein the method is repeated as newer versions of the data set are received.

16. The server of claim 1, wherein the method is repeated as previously received versions of the data set are ingested.

17. The server of claim 1, wherein the method is repeated at scheduled intervals regardless of whether the previously received versions were ingested.

18. The server of claim 1, wherein the data sets are from multiple geographic locations.

19. The server of claim 1, wherein the first and second versions are from multiple geographic locations.

* * * * *